(12) United States Patent
Imabayashi et al.

(10) Patent No.: US 6,535,264 B1
(45) Date of Patent: Mar. 18, 2003

(54) LIQUID CRYSTAL DISPLAY

(75) Inventors: Makiko Imabayashi, Tokyo (JP); Shinji Hasegawa, Tokyo (JP); Yasushi Iwakabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 282 days.

(21) Appl. No.: 09/710,613

(22) Filed: Nov. 8, 2000

(30) Foreign Application Priority Data

Nov. 10, 1999 (JP) .......................................... 11-319599

(51) Int. Cl.[7] .............................................. G02F 1/1339
(52) U.S. Cl. ........................ 349/155; 349/106; 349/110; 349/122
(58) Field of Search ................................ 349/106, 110, 349/153, 155, 166, 122

(56) References Cited

U.S. PATENT DOCUMENTS

| | | | |
|---|---|---|---|
| 5,381,255 A | * | 1/1995 | Ohnuma et al. ............ 349/106 |
| 6,124,917 A | * | 9/2000 | Fujioka et al. ............. 349/138 |
| 6,459,467 B1 | * | 10/2002 | Hashimoto et al. ......... 349/153 |

* cited by examiner

Primary Examiner—Robert H. Kim
Assistant Examiner—P. R. Akkapeddi
(74) Attorney, Agent, or Firm—Townsend and Townsend and Crew LLP

(57) ABSTRACT

A liquid crystal display device is capable of providing high-quality picture display by preventing luminance irregularity in a display screen due to the nonuniformity of a cell gap. The liquid crystal display device includes at least two or more kinds of color filters FIL formed over one of substrates, the color filters having different colors for displaying a color display, a black matrix interposed between each of the color filters, pixel-forming electrodes ITO2, an alignment control layer, a spacer SOC fixedly formed over at least one of the substrates with a height approximately equal to a desired gap between the substrates, and a bead interposed between the substrates and made of a resin material whose average grain size is slightly greater than the height of the spacer SOC.

16 Claims, 14 Drawing Sheets

SIGNALS FROM A HOST COMPUTER

OUTPUT TO DRAIN DRIVERS

SIGNAL FROM A HOST COMPUTER

OUTPUT TO GATE DRIVERS

LIQUID CRYSTAL DISPLAY

CROSS-REFERENCES TO RELATED APPLICATIONS

The present application is related to and claims priority from Japanese Patent Application No. 11-319599, filed Nov. 10, 1999.

FIELD OF THE INVENTION

The present invention relates to a liquid crystal display device and, more particularly, to a liquid crystal display device which is provided with a novel spacer arrangement for keeping constant the distance between a pair of substances which seal therebetween liquid crystal compounds which constitute a liquid crystal layer.

BACKGROUND OF THE INVENTION

Liquid crystal display devices are widely used as display devices capable of providing high-resolution and color display for notebook type computers or computer monitors.

These kinds of liquid crystal display device basically include a so-called liquid crystal panel in which liquid crystal compounds are interposed between at least two opposed substrates at least one of which is made of transparent glass or the like, and are generally divided into a type using a liquid crystal panel (simple matrix type: STN type) which selectively applies voltages to various kinds of pixel-forming electrodes formed over the substrates of the liquid crystal panel and turns on and off predetermined pixels, and a type using a liquid crystal panel(active matrix type) in which the various kinds of electrodes and pixel-selecting active elements are formed to turn on and off predetermined pixels by making selection from these active elements.

The active matrix type liquid crystal display devices are represented by a type which uses thin film transistors (TFTs) as active elements which constitute its liquid crystal panel. Liquid crystal display devices using thin film transistors have been widely spread as monitors for display terminals of OA equipment because of their thin sizes and light weights as well as their high picture qualities which compare with those of Braun tubes.

Liquid crystal panels for use in such an active matrix type liquid crystal display device are generally divided into the following two types on the basis of the difference between their liquid crystal driving methods. One of the types includes liquid crystal compounds interposed between two substrates on which transparent electrodes are formed, and the liquid crystal compounds are operated by voltages applied to the transparent electrodes and light which passes through the transparent electrodes and enters the layer of the liquid crystal compounds is modulated to display a picture (TN type).

The other type is constructed to operate a liquid crystal by an electric field which is formed between two electrodes formed on the same substrate, nearly in parallel with the surface thereof, and modulate light which enters the layer of liquid crystal compounds through the gap between the two electrodes, thereby displaying a picture. This type of liquid crystal display device has the feature of a remarkably wide viewing angle and is an extremely promising active matrix type liquid crystal display device. The feature of this type is described in, for example, International Patent Publication No. 505247/1993, Japanese Patent Publication No. 21907/1988 and Japanese Patent Laid-Open No. 160878/1994. This type of liquid crystal display device will be hereinafter referred to as the lateral electric field type (ISP type) of liquid crystal display device.

FIG. 14 is a diagrammatic cross-sectional view illustrating the essential portion of an example of the construction of a TN type of liquid crystal panel. In FIG. 14, symbols SUB1 and SUB2 denote transparent glass substrates. Thin film transistors TFT are formed over the inner surface of the transparent substrate SUB1, while color filters FIL (FIL(R), FIL(G) and FIL(B)) for three colors: red, green and blue are formed over the inner surface of the transparent substrate SUB2. Incidentally, the blue filter FIL(B) is not shown.

The thin film transistors TFT formed over the transparent substrate SUB1 are each made of a gate electrode GT, a gate insulating film GI, an insulating film AOF, a semiconductor layer AS, a drain electrode SD2 and a source electrode SD1, and a pixel electrode ITO1 is connected to the source electrode SD1. Incidentally, two thin film transistors TFT are formed per pixel for the purpose of improving the yield factor of products, but FIG. 14 shows one of the thin film transistors TFT (TFT1).

A protective film PSV1 is deposited as a layer which overlies these thin film transistors TFT, and an alignment layer (alignment control layer) ORI1 which is in contact with a liquid crystal (liquid crystal layer) LC is formed as the uppermost layer.

The shown liquid crystal panel has a light shield film, i.e., a so-called black matrix BM, at the boundary between each of the three color filters FIL (FIL(R), FIL(G) and FIL(B)) which are formed over the inner surface of the transparent substrate SUB2, and a protective film PSV2 is formed as a layer which overlies the black matrix BM. A common electrode (also called a counter electrode) ITO2 is formed over the protective film PSV2, and an alignment layer (alignment control layer) ORI2 which is in contact with the liquid crystal (liquid crystal layer) LC is formed as the uppermost layer. Polarizers POL1 and POL2 are stacked on the outer surfaces of the respective substrates SUB1 and SUB2.

This type of liquid crystal panel turns on/off each pixel by changing the alignment direction of the liquid crystal LC by means of an electric field generated between the common electrode ITO2 and the pixel electrode ITO1 which is driven by the thin film transistor TFT.

FIG. 15 is a diagrammatic cross-sectional view illustrating the essential portion of one example of the construction of an IPS type of liquid crystal panel. In FIG. 15, the same symbols as those shown in FIG. 14 denote the same functional portions as those shown in FIG. 14. In this liquid crystal panel, a video signal line (drain line) DL, a counter electrode CT (which corresponds to the common electrode ITO2 shown in FIG. 14), and a pixel electrode PX (which corresponds to the pixel electrode ITO1 shown in FIG. 14) are formed over one transparent substrate SUB1, and the alignment control layer ORI1 is formed at the interface between the layer of the liquid crystal LC and the protective film PSV which is deposited over the video signal line DL, the counter electrode CT and the pixel electrode PX. Color filters FIL for three colors (the three color filters are generally denoted by the common symbol FIL) which are separated from one another by the black matrix BM are formed over the other transparent substrate SUB2, and an overcoat layer OC (which corresponds to the protective film PSV2 shown in FIG. 14) is deposited to cover the black matrix BM and the color filters FIL so that the constituent materials of the color filters FIL and the black matrix BM are prevented from affecting liquid crystal compounds which constitute the liquid crystal LC. The alignment control layer ORI2 is formed at the interface between the overcoat layer OC and the liquid crystal LC.

The gate insulating film GI and the insulating film AOF which overlie the transparent substrate SUB1 are made of an insulating film, and the video signal line (drain line) DL is made of two layers: conductive films d1 and d2. The counter electrode CT is made of a conductive film g1, and the pixel electrode PX is made of a conductive film g2.

This IPS type of liquid crystal panel turns on/off each pixel by controlling the alignment direction of liquid crystal molecules by means of an electric field (shown as lines of electric force in FIG. 15) which is generated in a lateral direction (in a direction parallel to the substrates SUB1 and SUB2) between the pixel electrode PX and the counter electrode CT.

Incidentally, it is general practice to restrict the distance between the pair of substrates SUB1 and SUB2 (or the thickness of the layer of the liquid crystal compounds, or the gap between both substrates SUB1 and SUB2; hereinafter referred to as the cell gap or simply as the gap) to a predetermined value by disposing spherical spacers or spacers (not shown) between both substrates SUB1 and SUB2. The polarizers POL1 and POL2 are disposed on the outer surfaces of the respective substrates SUB1 and SUB2 in a manner similar to that shown in FIG. 14.

Although not related to the lateral electric field type of liquid crystal display device, Japanese Patent Laid-Open No. 73088/1997 discloses a liquid crystal display device in which, instead of such spherical spacers, conic spacers are formed on the protective film of a color filter substrate in such a manner as to be secured to the color filter substrate, or cylindrical spacers are fixedly formed on stacked color filter layers.

In the invention disclosed in the above-cited Japanese Patent Laid-Open No. 73088/1997, the spacers are formed in the state of being fixed to the substrate to solve problems which are experienced with the spherical spacers, such as a decrease in contrast due to light leaks from the peripheral portions of spherical spacers, and a display defect caused by spherical spacers being nonuniformly arranged in the process of scattering the spacers on the substrate.

Moreover, Japanese Patent Laid-Open No. 48636/1998 discloses IPS type TFT LCD has spacers in the intersection part of drain line and gate line.

Japanese Patent Laid-Open No. 325298/1995 discloses a method of forming spacers which hold the gap between substrates. This method uses a photolithographic process which stacks on a substrate a photosensitive sheet made of a base film coated with a photosensitive resin and executes exposure through a mask as well as development. This method is intended to make uniform the thickness of the spacers and prevent color irregularity.

As other prior arts, there are Japanese Patent Laid-Open No. 173104/1993 and No. 173148/1993 having bead in the display area.

In a liquid crystal display device using any of the above-described various kinds of liquid crystal panels, the gap between its substrates is restricted by a polymer-made bead (granular bead) or a columnar bead. In recent years, such a liquid crystal display device has been adopted not only in comparatively small-sized and light-weight electronic equipment such as notebook type personal computers, but also as a so-called display monitor, so that the liquid crystal display device has been becoming larger in screen size.

If the size of a liquid crystal panel (the size of a screen) becomes large, in a display device of the type which is normally used in vertical position, particularly in a display monitor, the following phenomenon may occur: the liquid crystal interposed between its substrates descends due to its own weight and the gap on the lower side of the screen becomes large, so that display irregularity occurs. Such a phenomenon is remarkable in IPS and STN types of liquid crystal panels. In addition, in a liquid crystal panel of the type which uses polymer beads as its gap restriction member, there are some cases where the polymer beads are concentrated in a portion and the gap locally increases or a so-called light leak occurs, i.e., light passes through the polymer beads which are generally transparent, so that the picture quality of the liquid crystal panel is degraded.

A liquid crystal panel in which spacers are fixedly formed on one of its substrate instead of the polymer beads is known as an approach to solving such a problem. However, when the liquid crystal panel which uses such spacers is in use, if the expansion of its liquid crystal due to a temperature rise (in general, due to heat radiated from a backlight) occurs, the gap restriction ability of the spacers cannot follow the enlargement of the gap, so that the spacers may separate from the opposed substrate. As a result, gap irregularity occurs and causes picture quality irregularity.

In the liquid crystal panel of the type which uses polymer beads for the restriction of the gap, since multiple polymer beads are interposed between the substrates in a compressively deformed state during the step of ensuring the gap of the liquid crystal panel after the multiple polymer beads have been scattered between the substrates, the gap restriction ability can follow the above-described enlargement of the gap to some extent. However, since more than a predetermined number of polymer beads are needed in order to ensure the required gap, the concentration of the polymer beads as well as the occurrence of light leak can only be restrained within limits. In addition, as described above, there is the problem that the polymer beads descend with time toward the lower side of the liquid crystal panel due to their own weights during the repetition of the thermal expansion of the liquid crystal panel, or along with a descend of the liquid crystal.

SUMMARY OF THE INVENTION

The present invention solves the above-described problems of the related art and provides a liquid crystal display device which can display a high-quality picture by preventing gap irregularity due to a variation in the temperature of a liquid crystal panel.

According to one aspect of the present invention, spacer and bead fixedly formed on at least one of a pair of substrates which constitute a liquid crystal panel and a small number of polymer beads are used together as members which restrict the gap between the pair of substrates.

Although the construction of the present invention slightly differs among liquid-crystal-panel driving schemes (STN, TN and IPS), the basic construction in which both spacers and a small number of polymer beads are used together is common to any type of liquid crystal panel. Representative aspects of the present invention will be described below.

According to an aspect of the present invention, a liquid crystal display device includes: a liquid crystal panel having a pair of substrates, at least two or more kinds of color filters formed over one of a pair of substrates, a black matrix interposed between each of color filters in matrix shape, a liquid crystal layer interposed between a pair of substrates, a spacer formed on at least one of a pair of substrates, and a bead interposed between a pair of substrates, wherein a spacer is disposed under a black matrix, and the height of a bead is greater than the height of a spacer.

In the aspect, the gap between the pair of substrates is mainly restricted by the height of the spacer, and when the liquid crystal display device is in use, if the spacer is separated from a substrate due to the expansion of the liquid crystal due to a temperature rise or the like and the gap is enlarged, the spacer is restored in a direction in which compressive deformation of a bead is released, thereby restricting the gap. Thus, the gap irregularity of its screen is reduced, and since the bead is maintained in contact with the substrate, the bead is prevented from traveling or descending due to its own weight and the liquid crystal is also restrained from traveling or descending, whereby the display quality of the liquid crystal display device is prevented from being extremely degraded.

Since the spacer is formed in the area covered with the black matrix, the spacer does not affect the transmission of light from a backlight. In addition, since only a small number of beads are needed, the phenomenon of light leak can be restrained to the minimum and a decrease in contrast can be restrained.

Moreover, the spacer is formed of the resin material by a photolithographic technique. Since the spacer is formed directly on the protective film as described above in the fourth aspect, the spacer can be firmly secured to the substrate which the spacer is formed. The substrate on which the spacer is formed is not limited to the substrate having the color filters, and the spacer can also be formed on the other substrate (in an active matrix type, a substrate on which thin film transistors are formed).

In a case where an electrode overlies the aforesaid underlying protective film, an opening is formed in the electrode and the spacer is connected to the protective film which underlies the electrode through the opening, whereby the spacer can be firmly secured to the substrate on which the spacer is formed.

Incidentally, the present invention is not limited to any of the above-described aspects, and spacers each having a height equivalent to half of the required gap may be formed, respectively, on a pair of substrates in opposition to each other.

Various modifications of the present invention can be made without departing from the technical ideas described in the appended claims.

BRIEF DESCRIPTION OF THE DRAWINGS

Preferred embodiments of the invention will be described in detail with reference to the following figures, wherein.

DESCRIPTION OF THE EMBODIMENTS

Preferred embodiments of the present invention will be described below in detail with reference to drawings which show the embodiments.

Figure 1:
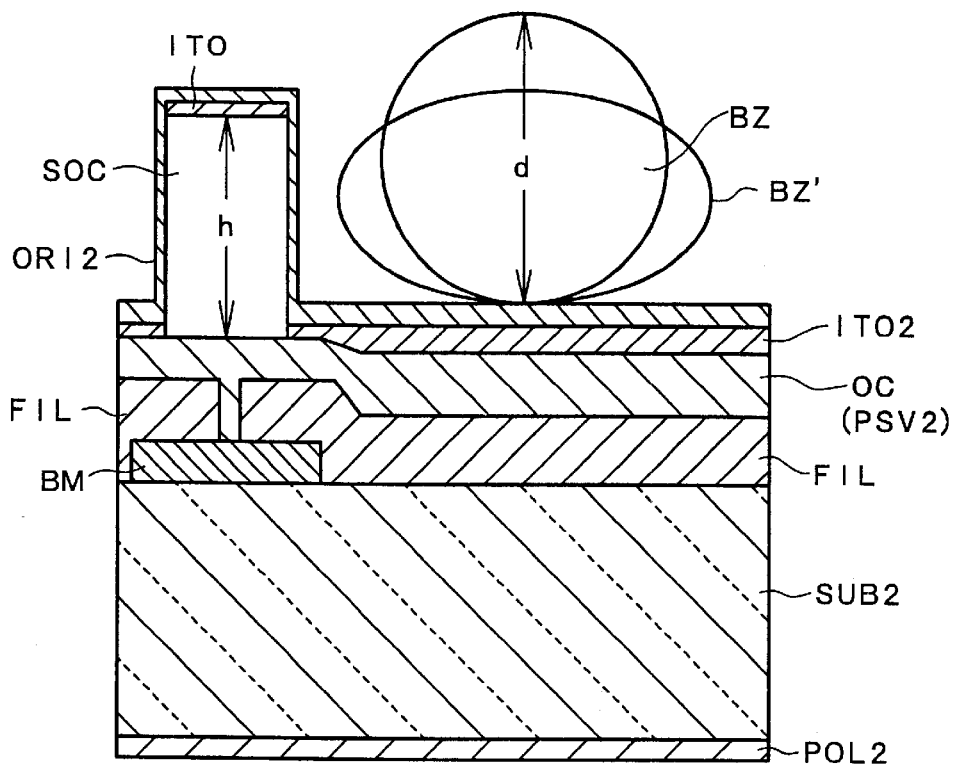
FIG. 1 is a diagrammatic cross-sectional view of the essential portion of a liquid crystal panel, illustrating a first embodiment of the liquid crystal display device according to the present invention.

FIG. 1 is a diagrammatic cross-sectional view of the essential portion of a liquid crystal panel, illustrating a first embodiment of the liquid crystal display device according to the present invention, and shows a construction in which the present invention is applied to a type (a TN type or an STN type) having electrodes on a substrate on which spacers are formed. In the STN type of liquid crystal panel, unlike the TN type of liquid crystal panel, there is no discrimination between pixel electrodes and common electrodes or counter electrodes, and stripe-shaped electrodes are respectively formed on a pair of substrates in such a manner that the stripe-shaped electrodes formed on one of the substrates intersect with those formed on the other. Accordingly, if the following description is to be applied to the STN type, the pixel electrodes and the common electrodes are to be read as the stripe electrodes.

In FIG. 1, symbol SUB2 denotes one (in FIG. 1, a color filter substrate) of a pair of substrates which constitute the liquid crystal panel, symbol BM a black matrix, symbol FIL a color filter, symbol OC a protective film (also called a protective film PSV2), symbol ITO2 a common electrode opposed to a pixel electrode which is formed on the other substrate which is not shown, symbol SOC a spacer, symbol ORI2 an alignment layer, symbol BZ a bead (hereinafter referred to also as a polymer bead), and symbol POL a polarizer.

After the black matrix BM, the color filters FIL and the protective film OC have been formed, the spacer SOC is formed directly on the protective film OC. The black matrix BM, the color filters FIL and the spacer SOC are formed by a process which includes application of a resin material, pattern exposure and development, i.e., a photolithographic technique.

The spacer SOC is formed to have a height h approximately equal to a predetermined gap between the substrates. After that, the common electrode ITO is formed on the top of the spacer SOC and the alignment layer ORI2 is formed as a layer which overlies the spacer SOC, thereby forming a so-called color filter substrate.

Before the other substrate having pixel electrodes is stuck to the substrate on which such various kinds of function films are formed, with a liquid crystal LC interposed between both substrates, a small number of polymer beads BZ are scattered.

An average grain size d of such a polymer bead BZ is selected to be slightly greater than the height h of the spacer SOC.

When this substrate SUB2 is to be stuck to the other substrate so that the predetermined gap is ensured with the liquid crystal interposed therebetween, both substrates are pressed so that the top surface of the spacer SOC of the substrate SUB2 is brought into contact with an alignment film on the other substrate. At this time, the polymer bead BZ having the average grain size d which is slightly greater than the height h of the spacer SOC is compressively deformed between the substrate SUB2 and the other substrate into a state denoted by BZ', in which a height which passes through the center of the polymer bead BZ is approximately equal to the height h of the spacer SOC. (Incidentally, FIG. 2 exaggeratedly shows the deformed state of the polymer bead BZ.)

According to the first embodiment, when a liquid crystal display device is in use, if the temperature of its liquid crystal panel rises and spacers are separated from a substrate due to the expansion of its liquid crystal and the gap is enlarged, the beads are restored in a direction in which their compressive deformation is released, thereby restricting the gap. Thus, the gap irregularity of its screen is reduced, and since the beads are maintained in contact with the substrate, the beads are prevented from traveling or descending due to their own weights and the liquid crystal is also restrained from traveling or descending, whereby the display quality of the liquid crystal display device is prevented from being extremely degraded.

Moreover, Inventors had found out two important matters concerning the height of spacers and beads with experimentation. In the first case, the gap is enlarged caused by the thermal expansion of liquid crystal molecules.

Here, we lay down a definition of the rate of the thermal expansion of liquid crystal molecules is 7.0E-4($cm^{-3}$/g/degree), the rate of the thermal expansion of beads is 9.8E-5, the rate of the thermal expansion of SOC is 6.0E-5, the density of liquid crystal molecules is 1.081($g/cm^{-3}$)(25 degrees).

When a temperature of liquid crystal molecules change from 25 degrees at ON state of a backlight unit to 55 degrees at OFF state of a backlight unit, the volume expansion of liquid crystal molecules is the same with the gap increase. We think that a rise of 30 degrees generates the range from 1.0–1.095 times gap between substrates. Therefor, the bead should have a height within a range from 1.0–1.095 times the height of the spacer. It can be compensated for by the beads and the occurrence of gap irregularity in a display area can be restrained, whereby the restriction of the gap which cannot be followed by the spacers.

In the next case, the gap is enlarged caused by gravitational falling of liquid crystal molecules to the lower portion of LCD panel. We think that 20% Spacer remove from substrate and cause improper image for LCD panel by the enlarging gap. As the elasticized deformation of spacer is 1/10 of bead's elasticized deformation, it can be compensated for by the bead which has a height within a range from 1.0–1.2 times the height of a spacer.

Figure 2:
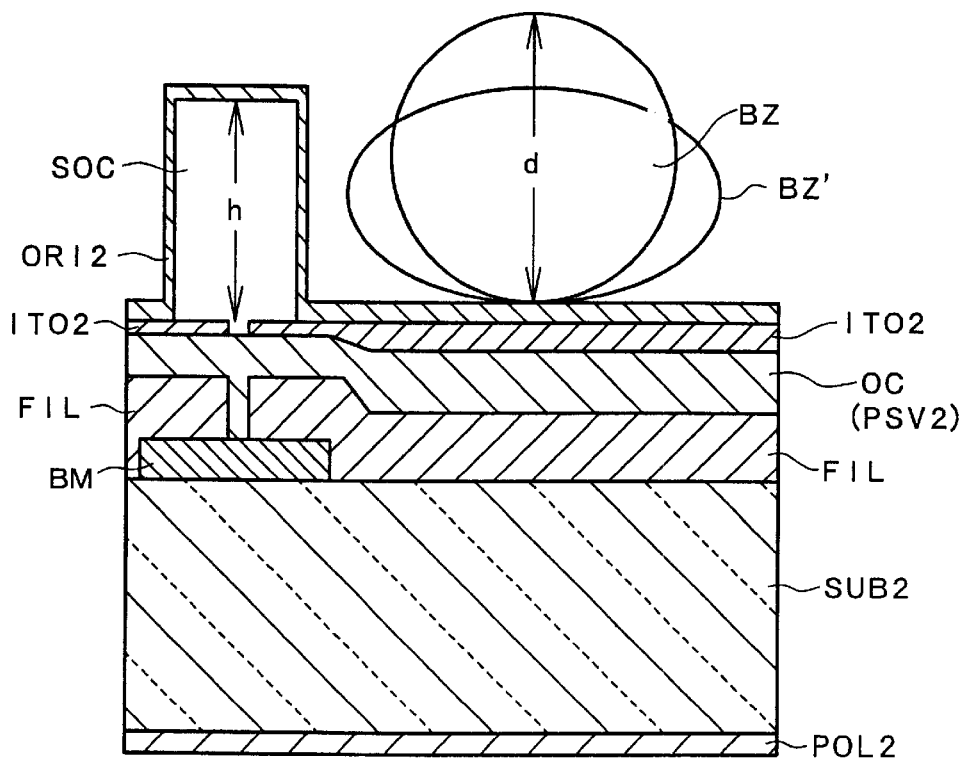
FIG. 2 is a diagrammatic cross-sectional view of the essential portion of a liquid crystal panel, illustrating a second embodiment of the liquid crystal display device according to the present invention.

FIG. 2 is a diagrammatic cross-sectional view of the essential portion of a liquid crystal panel, illustrating a second embodiment of the liquid crystal display device according to the present invention. The spacer SOC is formed on the electrode ITO2 shown in FIG. 1. In FIG. 2, the same symbols as those shown in FIG. 1 denote the same functional portions as those shown in FIG. 1, and symbol TH denotes an opening formed in the electrode ITO2.

In the second embodiment shown in FIG. 2, the spacer SOC is formed after the electrode ITO2 has been formed. At this time, since the opening TH is formed in the portion of the electrode ITO2 in which the spacer SOC is to be formed, the spacer SOC is connected to the protective film OC which underlies the electrode ITO2 and is made of a resin material, whereby the spacer SOC is secured to the substrate SUB2. Incidentally, the spacer SOC and the polymer bead BZ are similar in function to those of the first embodiment.

Figure 3:
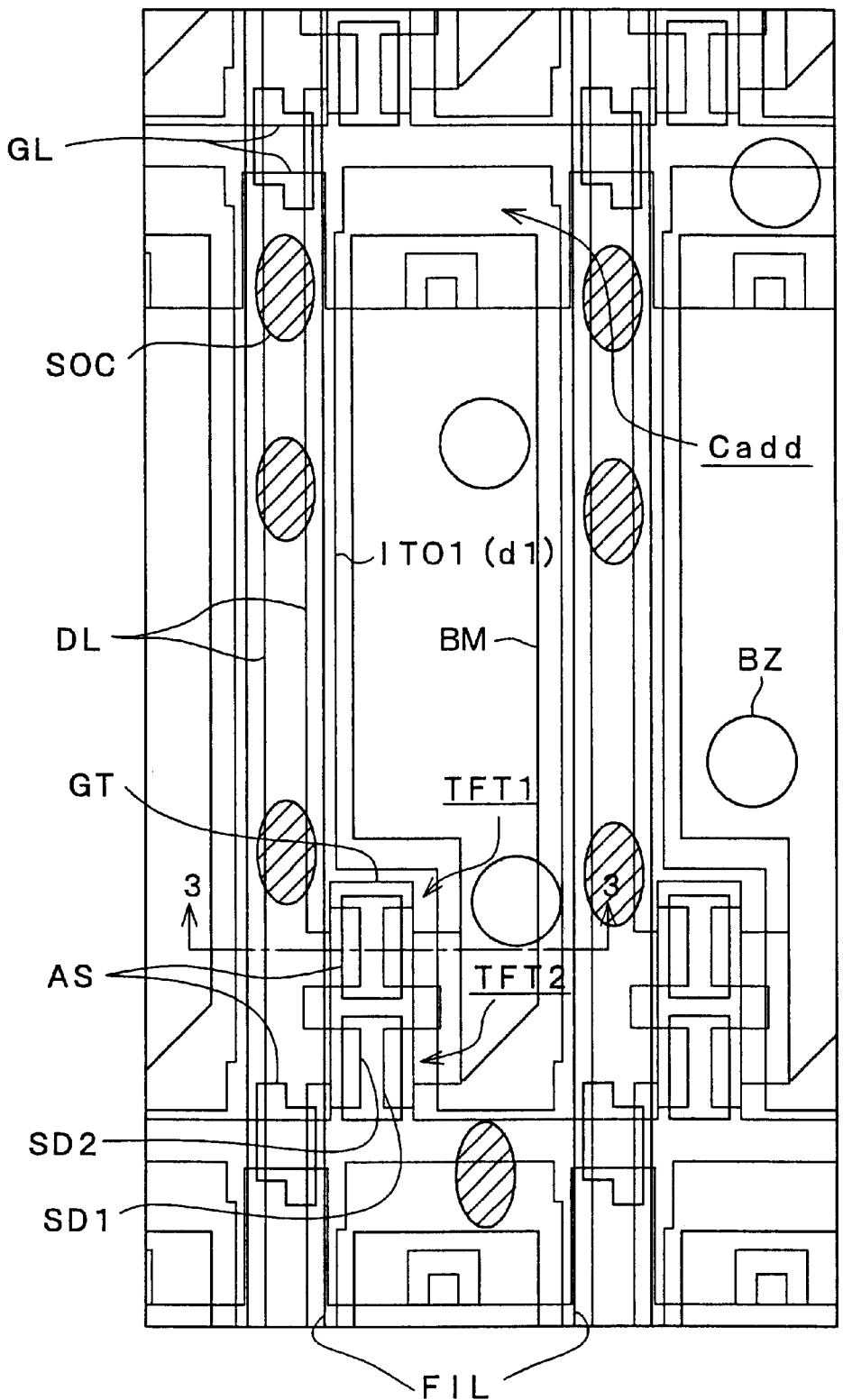
FIG. 3 is a view for further illustrating the second embodiment of the liquid crystal display device according to the present invention, and is a plan view of a substrate SUB1 as seen through a substrate SUB2 to be described later in connection with FIG. 2, showing one pixel and the vicinity thereof which constitute a thin film transistor TN type of liquid crystal panel.
Figure 14:
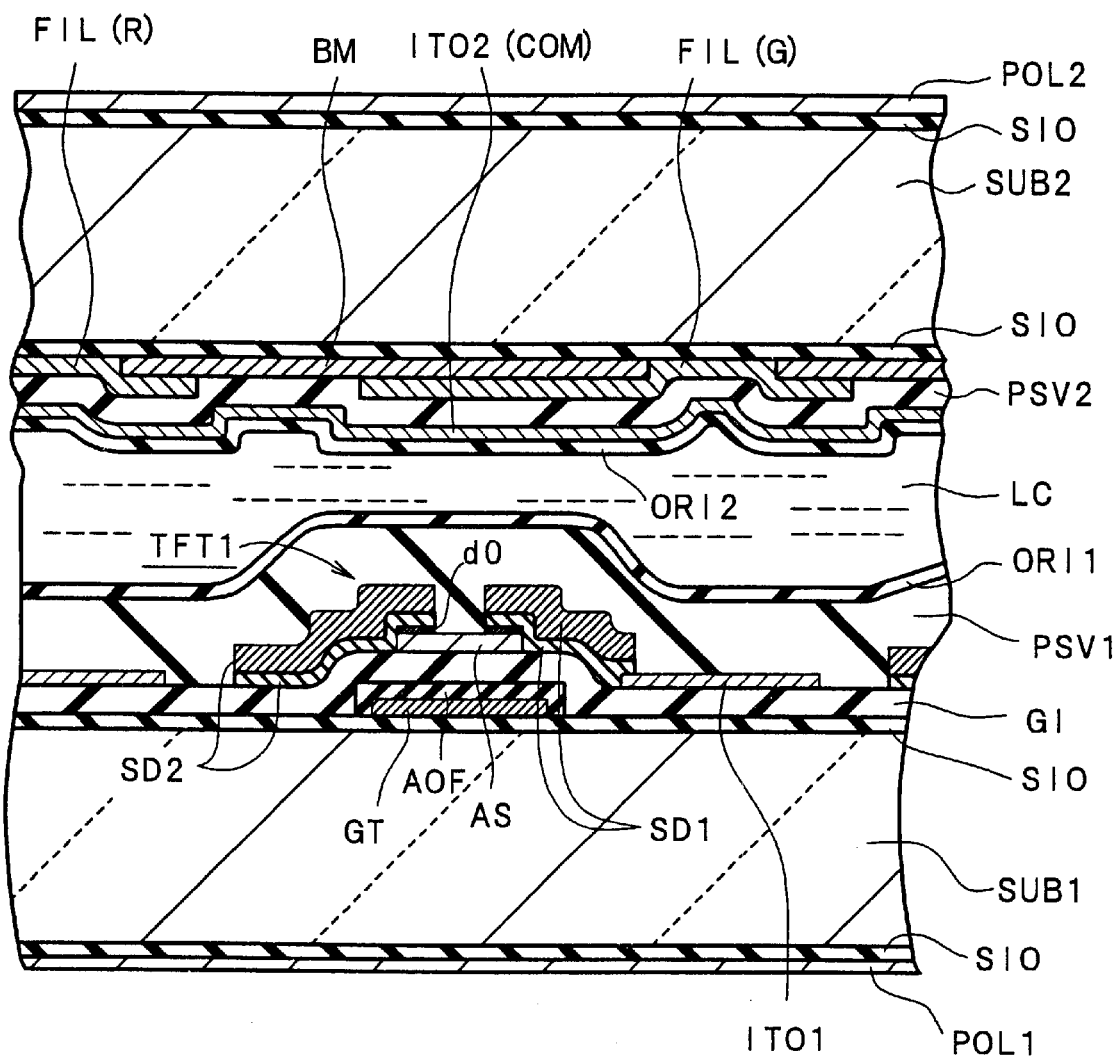
FIG. 14 is a diagrammatic cross-sectional view illustrating the essential portion of an example of the construction of a TN type of liquid crystal panel.

FIG. 3 is a view for further illustrating the second embodiment of the liquid crystal display device according to the present invention, and is a plan view of the substrate SUB1 as seen through the substrate SUB2 described above in connection with FIG. 2, showing one pixel and the vicinity thereof which constitute a thin film transistor TN type of liquid crystal panel. FIG. 14 described previously corresponds to a cross-sectional view taken along line 3—3 of FIG. 3.

Each pixel (unit color pixel) which constitutes this liquid crystal panel is disposed in the area of intersection (the area surrounded by four signal lines) of two adjacent gate lines (also called scanning signal lines, gate signal lines, gate lines or horizontal signal lines) GL and two adjacent data lines (also called video signal lines, drain signal lines, drain lines or vertical signal lines) DL.

Each pixel includes thin film transistors TFT (TFT1 and TFT2), a pixel electrode ITO1 and a holding capacitance element Cadd. Plural gate lines GL are disposed to be extended in the column direction and to be juxtaposed in the raw direction. Plural data lines DL are disposed to be extended in the row direction and to be juxtaposed in the column direction.

Figure 15:
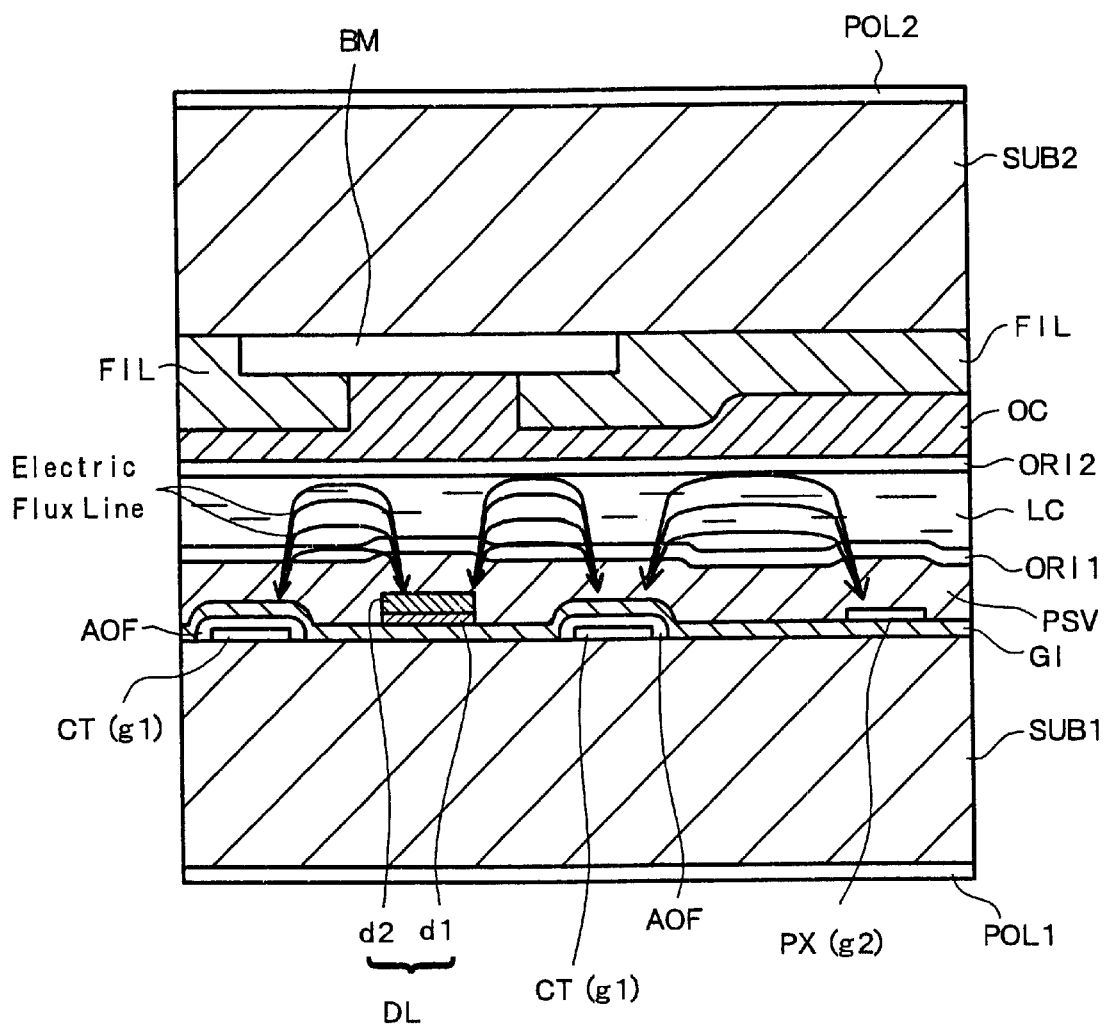
FIG. 15 is a diagrammatic cross-sectional view illustrating the essential portion of an example of the construction of an IPS type of liquid crystal panel.

As described previously with reference to FIG. 15, the thin film transistors TFT and the pixel electrode ITO1 are formed on the substrate SUB1 which lies on one side of the liquid crystal LC, while the color filters FIL and the black matrix BM are formed on the substrate SUB2 which lies on the other side of the liquid crystal LC. Each of the upper and lower transparent glass substrates SUB2 and SUB1 has, for example, a thickness of about 1.1 mm or about 0.7 mm.

In the second embodiment, the spacers SOC are formed to be positioned on the data lines DL and the gate lines GL in an area covered with the black matrix BM. The gap of this liquid crystal panel is mainly restricted by the spacers SOC, and the polymer beads BZ are provided for the purpose of reducing gap irregularity mainly during the state in which the spacers SOC cannot follow the enlargement of the gap, and a small number of polymer beads BZ are scattered in each pixel area (on each pixel electrode).

Incidentally, the forming location, the number and the shapes of the spacers SOC are not limited to the shown example. Although in FIG. 3 the sizes of the spacers SOC and the polymer beads BZ are exaggeratedly shown for ease of understanding, they do not necessarily agree with the sizes of actual products.

According to the second embodiment as well, when a liquid crystal display device is in use, if the temperature of its liquid crystal panel rises and spacers are separated from a substrate due to the expansion of its liquid crystal and the gap is enlarged, the beads are restored in a direction in which their compressive deformation is released, thereby restricting the gap. Thus, the gap irregularity of its screen is reduced, and since the beads are maintained in contact with the substrate, the beads are prevented from traveling or descending due to their own weights and the liquid crystal is also restrained from traveling or descending, whereby the display quality of the liquid crystal display device is prevented from being extremely degraded.

Figure 4:
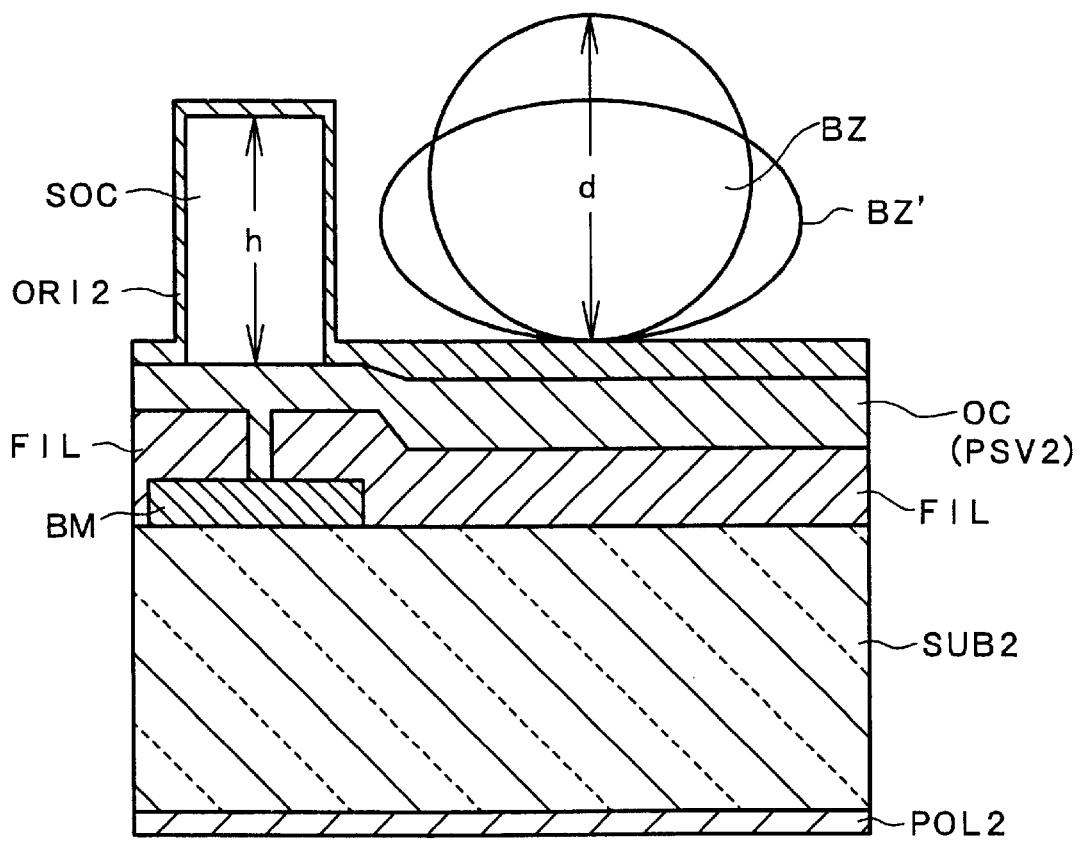
FIG. 4 is a diagrammatic cross-sectional view of the essential portion of a liquid crystal panel, illustrating a third embodiment of the liquid crystal display device according to the present invention.

FIG. 4 is a diagrammatic cross-sectional view of the essential portion of a liquid crystal panel, illustrating a third embodiment of the liquid crystal display device according to the present invention, and shows a construction in which the present invention is applied to a lateral electric field type active matrix type (IPS type) having no electrodes on a substrate on which spacers are formed.

Since the third embodiment has no electrodes ITO on the substrate SUB2 on which the color filters FIL are formed, the spacer SOC is formed on the protective film OC formed over the inner surface of the substrate SUB2. (In this case, the protective film OC functions as a film which prevents the contamination of the liquid crystal LC due to the color filters FIL or the black matrix BM, and as a film for flattening the inner surface of the substrate SLB2).

After the spacer SOC has been formed on the protective film OC, the alignment layer ORI2 is deposited and is then given an alignment control ability by rubbing or the like. Then, the polymer beads BZ are scattered on the alignment layer ORI2 in the pixel areas of the substrate SLB2 on which the spacers SOC are formed, and the liquid crystal LC is injected or dropped and the other substrate SUB1 is stacked on the substrate SUB2.

Thin film transistors, pixel electrodes, counter electrodes, interconnecting lines and others are formed on the substrate SUB1.

After the pair of substrates SLB1 and SUB2 have been stuck together with the liquid crystal LC interposed therebetween, both substrates SUB1 and SUB2 are pressed from above and below so that the predetermined gap is ensured therebetween. At this time, the predetermined gap is mainly restricted by the columnar heights h of the spacers SOC, and as shown at BZ in FIG. 4, each of the polymer beads BZ is brought to a compressively deformed state in which its height is made smaller than the original grain size d. Since the function of the polymer beads BZ is similar to that described above in connection with the first embodiment, the same description is omitted.

Figure 5:
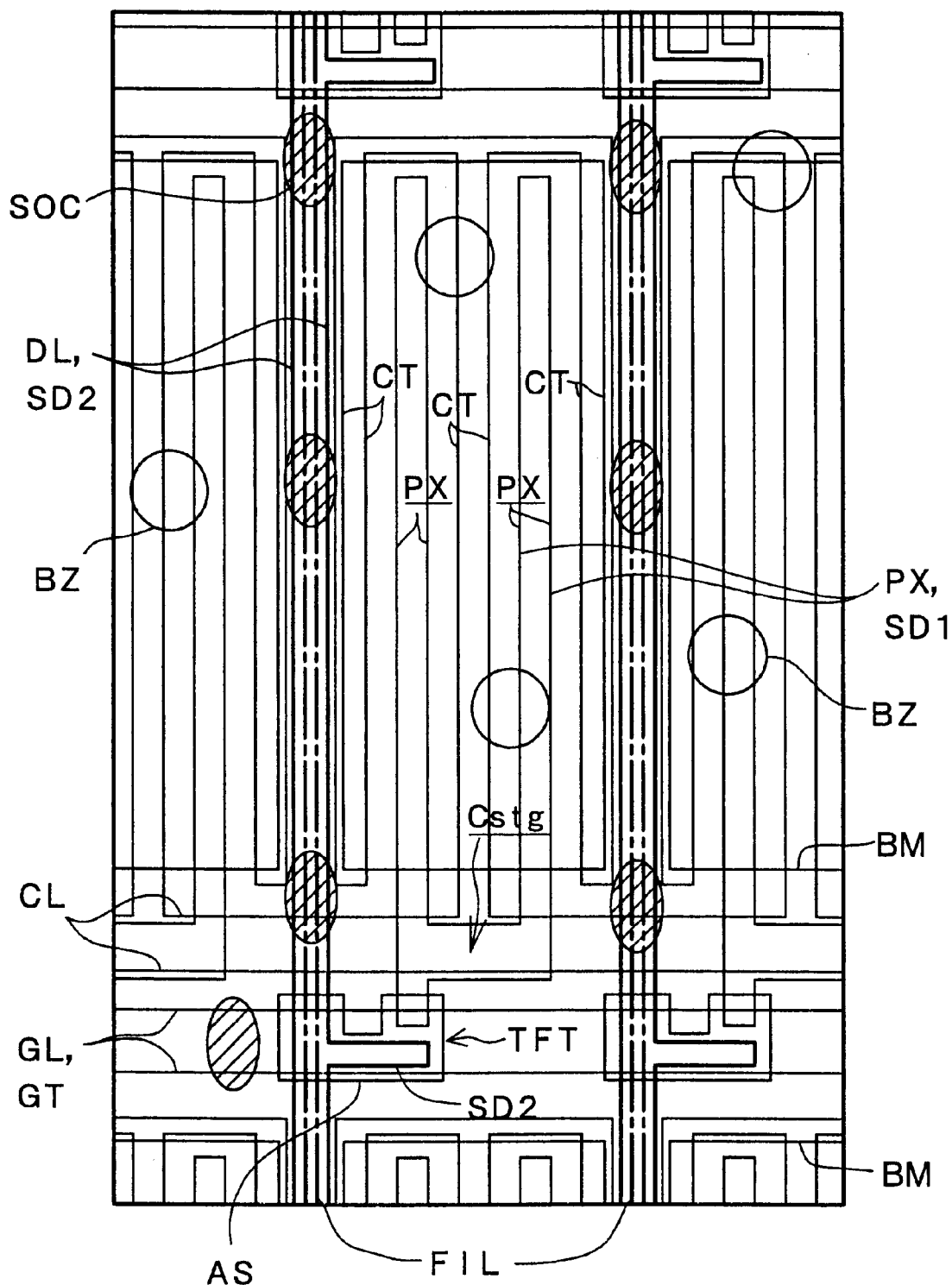
FIG. 5 is a view for further illustrating the third embodiment of the liquid crystal display device according to the present invention, and is a plan view of the substrate SUB1 as seen through the substrate SUB2 to be described later in connection with FIG. 4, showing one pixel and the vicinity thereof which constitute a thin film transistor IPS type of liquid crystal panel.

FIG. 5 is a view for further illustrating the third embodiment of the liquid crystal display device according to the present invention, and is a plan view of the substrate SUB1 as seen through the substrate SUB2 described above in connection with FIG. 4, showing one pixel and the vicinity thereof which constitute a thin film transistor IPS type of liquid crystal panel.

Each pixel is disposed in the area of intersection (the area surrounded by four signal lines) of a scanning signal line (also called a gate signal line, a gate line or a horizontal signal line) GL, a counter voltage signal line (counter electrode line) CL, and two adjacent data lines (also called drain signal lines, drain lines or vertical signal lines) DL.

Each pixel includes a thin film transistor TFT, a storage capacitance Cstg, a pixel electrode PX and a counter electrode CT. Plural scanning signal lines GL and plural counter voltage signal lines CL are disposed to be extended in the horizontal direction and to be juxtaposed in the vertical direction as viewed in FIG. 5.

Plural video signal lines DL are disposed to be extended in the vertical direction and to be juxtaposed in the horizontal direction. The pixel electrode PX is electrically connected to the thin film transistor TFT via a source electrode SD1. The counter electrode CT is electrically connected to the counter voltage signal line CL.

The pixel electrode PX and the counter electrode CT are opposed to each other and are constructed in a comb-teeth-like shape so that the optical state of the liquid crystal LC is controlled by an electric field between each of the pixel electrodes PX and the corresponding one of the counter electrodes CT, thereby controlling the display of the liquid crystal display device.

In the third embodiment, the spacers SOC are formed on the video signal lines DL, the scanning signal lines GL or the counter voltage signal lines CL all of which are covered with the black matrix BM. A small number of polymer beads BZ are scattered mainly in areas except the area of the black matrix BM, i.e., in each pixel area.

Incidentally, the forming location, the number and the shapes of the spacers SOC are not limited to the shown example. Although in FIG. 5 the sizes of the spacers SOC and the polymer beads BZ are exaggeratedly shown for ease of understanding, they do not necessarily agree with the sizes of actual products.

According to the third embodiment as well, when a liquid crystal display device is in use, if the temperature of its liquid crystal panel rises and spacers are separated from a substrate due to the expansion of its liquid crystal and the gap is enlarged, the beads are restored in a direction in which their compressive deformation is released, thereby restricting the gap. Thus, the gap irregularity of its screen is reduced, and since the beads are maintained in contact with the substrate, the beads are prevented from traveling or descending due to their own weights and the liquid crystal is also restrained from traveling or descending, whereby the display quality of the liquid crystal display device is prevented from being extremely degraded.

Figure 6:
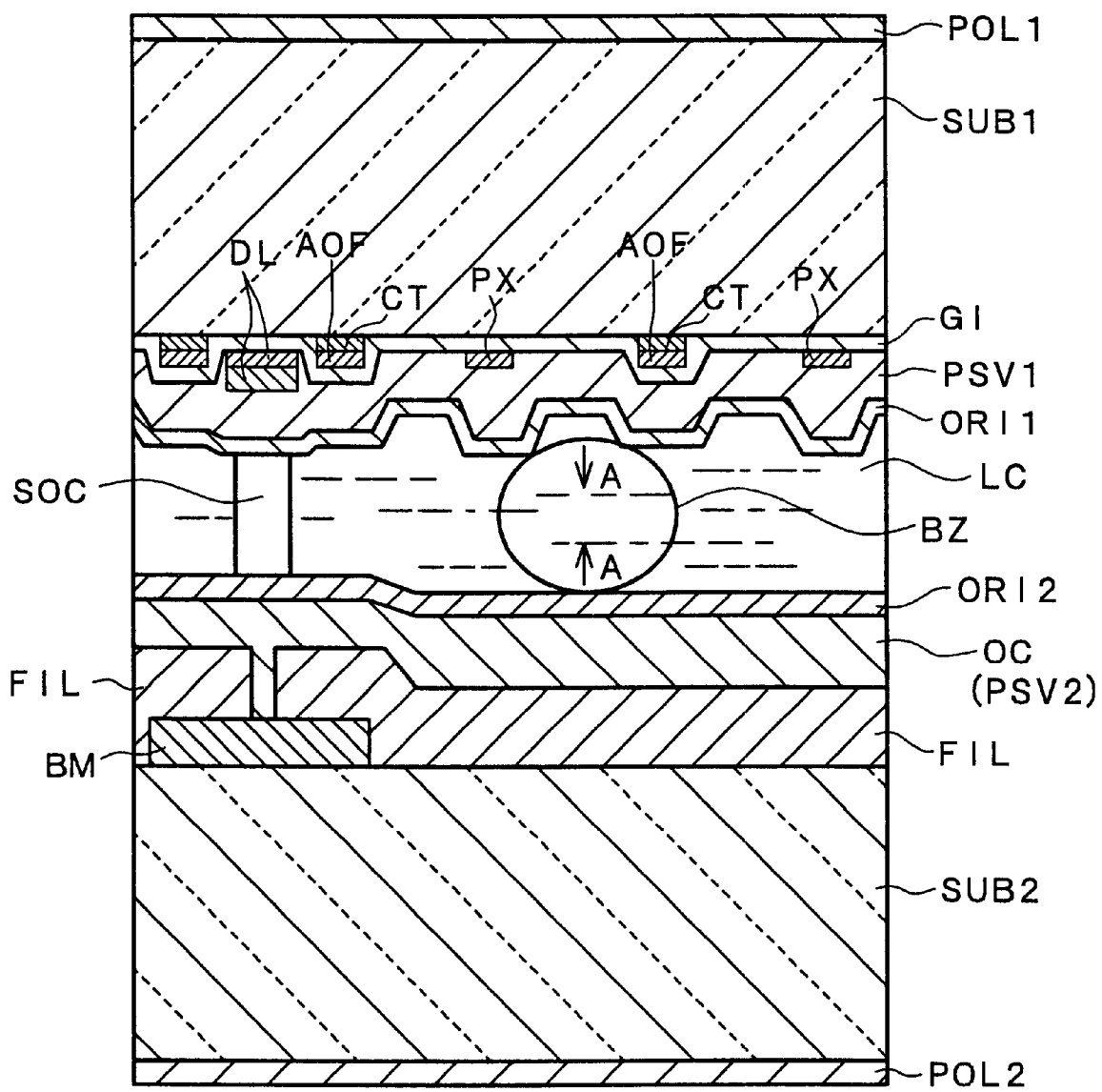
FIG. 6 is a diagrammatic cross-sectional view of the essential portion of the liquid crystal panel, illustrating the advantage of the third embodiment of the liquid crystal display device according to the present invention.
Figure 7:
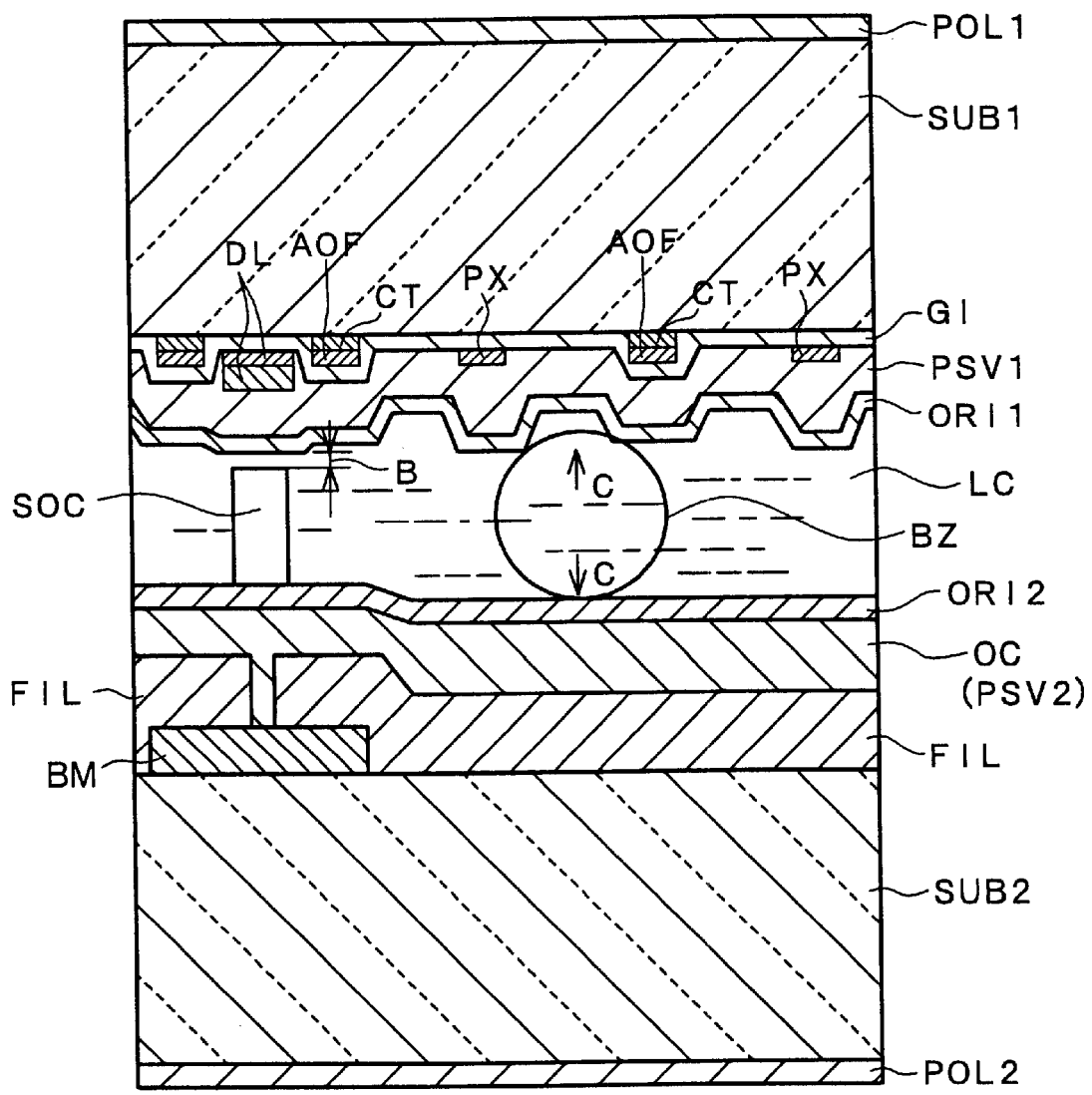
FIG. 7 is a diagrammatic cross-sectional view of the essential portion of the liquid crystal panel, illustrating the advantage of the third embodiment of the liquid crystal display device according to the present invention.

FIGS. 6 and 7 are diagrammatic cross-sectional views of the essential portion of the liquid crystal panel, illustrating the advantage of the third embodiment of the liquid crystal display device according to the present invention, and also show the state in which the substrate SUB1 on which thin film transistors, pixel electrodes, counter electrodes, interconnecting lines and others are formed is stuck to the substrate SUB2 on which the spacers SOC are formed, with the liquid crystal LC interposed therebetween, and both substrates SUB1 and SUB2 are pressed to ensure the predetermined gap therebetween.

The respective members of the construction of the substrate SUB1 are denoted by the same symbols as those shown in FIG. 5 described above. The respective members of the construction of the substrate SUB2 are denoted by the same symbols as those shown in FIG. 4 described above.

When the liquid crystal panel is in the state shown in FIG. 6 in which the predetermined gap is ensured, the top surface of the spacer SOC is in abutment with the substrate SUB1, and the polymer bead BZ is compressively deformed as shown by arrows A in FIG. 6.

During that state, if the liquid crystal LC expands due to heat radiated from a backlight or the like and the gap between the substrates SUB1 and SUB2 is enlarged as shown in FIG. 7, there are some cases in which the top surface of the spacer SOC separates from the substrate SUB1 as shown by an arrow B and the gap restriction ability of the spacer SOC is lost. However, at this time, the polymer bead BZ tends to restore its original gain size as shown by arrows C, and follows the enlargement of the gap and restricts the gap between both substrates SUB1 and SUB2.

Accordingly, it is possible to reduce the gap irregularity of the screen of the liquid crystal panel, whereby it is possible to maintain high-quality picture display. The movement of a spacer SOC and polymer bead BZ is the same as that of other above-described embodiments.

The driving of a liquid crystal display device to which any of the above-described embodiments of the present invention is applied as well as an example of the construction of a product of the liquid crystal display device will be described below. Incidentally, a description as to a liquid crystal display device which uses an STN type of liquid crystal panel is omitted herein.

Figure 8:
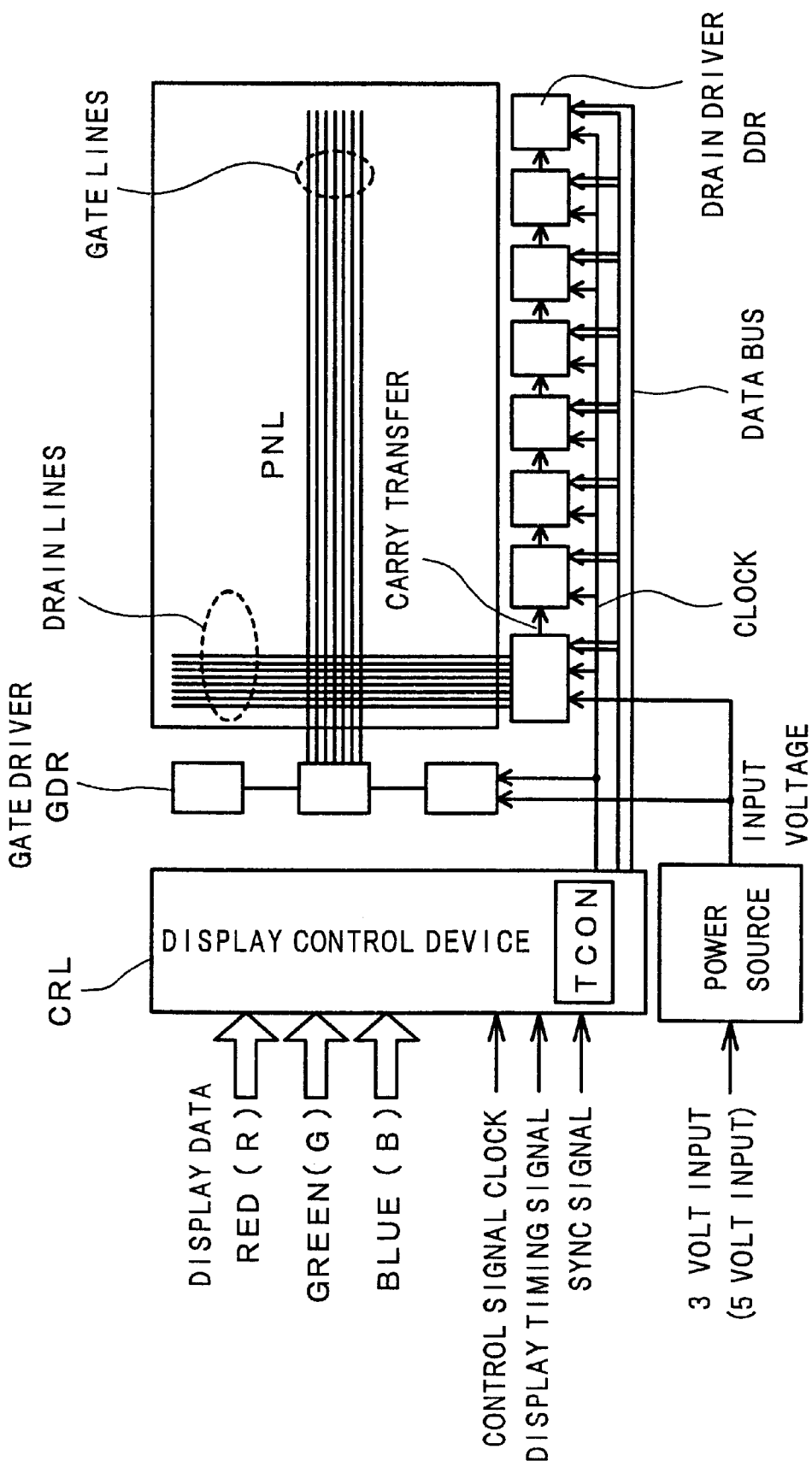
FIG. 8 is an explanatory view of the construction and the drive system of an active matrix type liquid crystal display device to which the present invention is applied.

FIG. 8 is an explanatory view of the construction and the drive system of an active matrix type liquid crystal display device to which the present invention is applied. This liquid crystal display device uses an active matrix type liquid crystal panel according to any of the above-described embodiments. The liquid crystal display device has a liquid crystal panel PNL, drain drivers DDR which are circuits (IC chips) for driving data lines (also called drain signal lines, drain lines or video signal lines), and gate drivers GDR which are circuits (IC chips) for driving scanning signal lines (also called gate signal lines or gate lines), the drain drivers DDR and the gate drivers GDR being provided at the periphery of the liquid crystal panel PNL. The liquid crystal display device is also provided with a power source circuit (marked with "power source part" in FIG. 8) PWU and a display control device (marked with "controller" in FIG. 8) CRL which is a display control part for supplying display data for displaying a picture, clock signals and gray scale voltages and the like to the drain drivers DDR and the gate drivers GDR.

Display data supplied from an external signal source such as a computer, a personal computer or a television receiver circuit, a control signal clock, a display timing signal and a synchronizing signal are inputted to the display control device CRL. The display control device CRL is provided with a gray scale reference voltage generation part, a timing controller TCON and the like, and converts the display data supplied from an external part into data of the type which conforms to the format of display on the liquid crystal panel PNL.

Display data and clock signals for the gate drivers GDR and the drain drivers DDR are supplied as shown in FIG. 8. A carry output from each of the drain drivers DDR is applied to the carry input of the next one on an unmodified basis.

Figure 9:
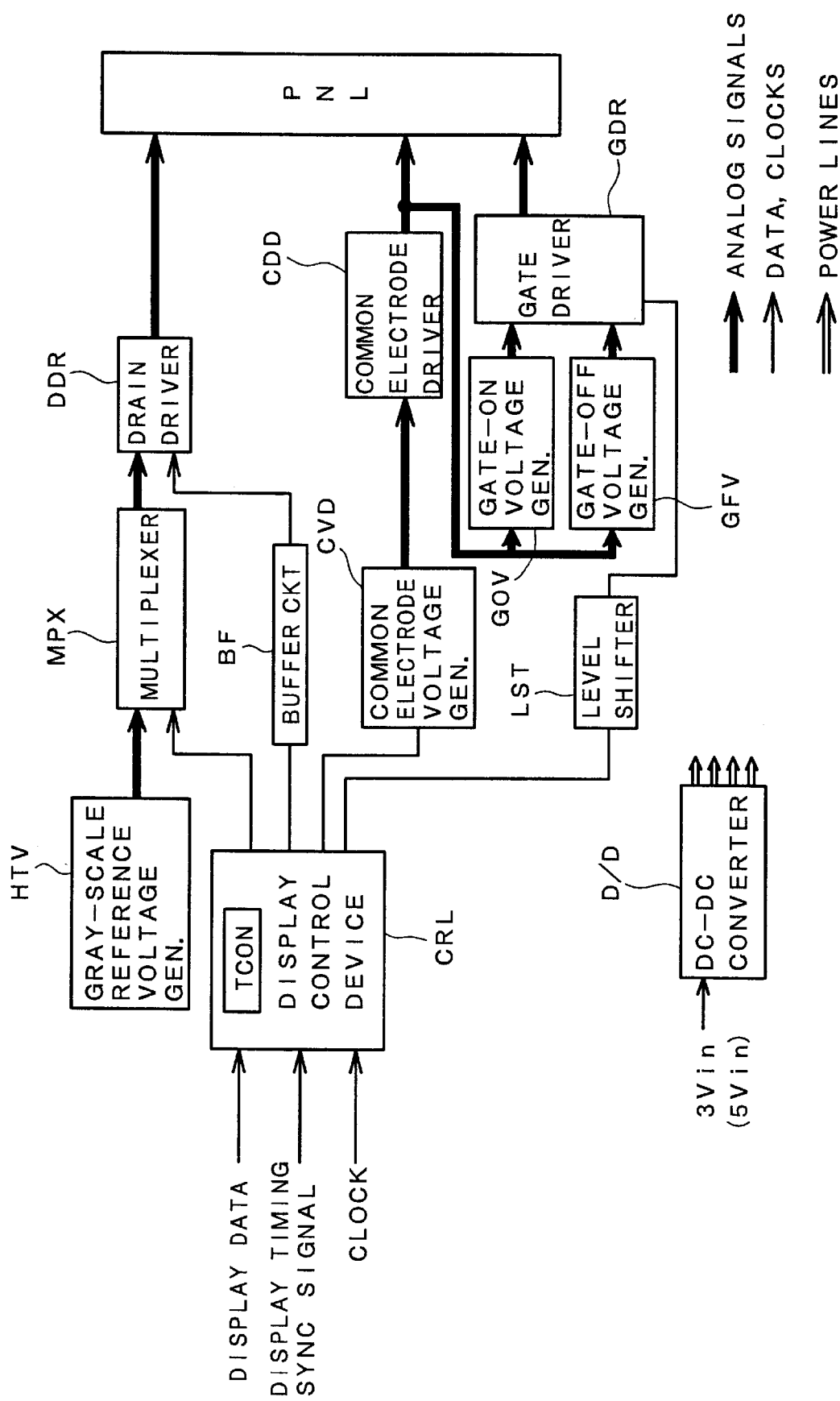
FIG. 9 is a block diagram schematically showing the arrangement of individual drivers of the liquid crystal panel as well as the flow of signals.

FIG. 9 is a block diagram schematically showing the arrangement of individual drivers of the liquid crystal panel PNL as well as the flow of signals. The drain driver DDR is made of a data latch part for display data such as video (picture) signals, and an output voltage generation circuit. A gray scale reference voltage generation part HTV, a multiplexer MPX, a common voltage generation part CVD, a common driver CDD, a level shifting circuit LST, a gate-on voltage generation part GOV, a gate-off voltage generation part GFD and a DC-DC converter D/D are provided in the power source circuit PWU shown in FIG. 17.

Figure 10:
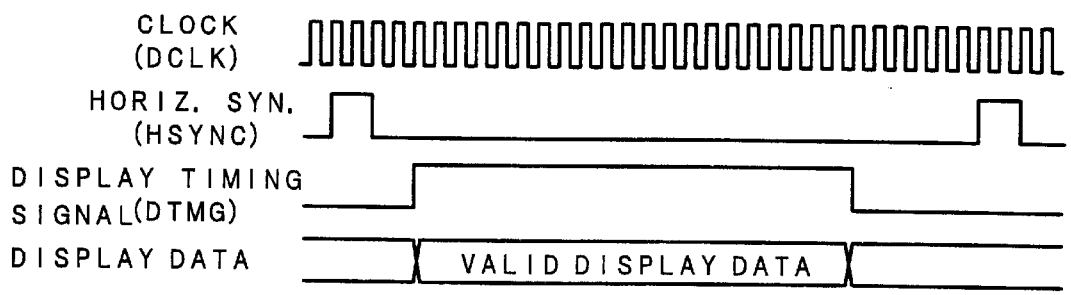
FIG. 10 is a timing chart showing display data to be inputted to a display control device from a signal source (main frame) and signals to be outputted to a drain driver and a gate driver from the display control device.
Figure 10:
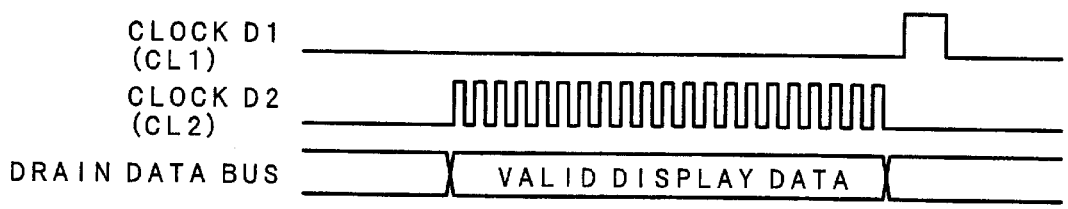
Figure 10:
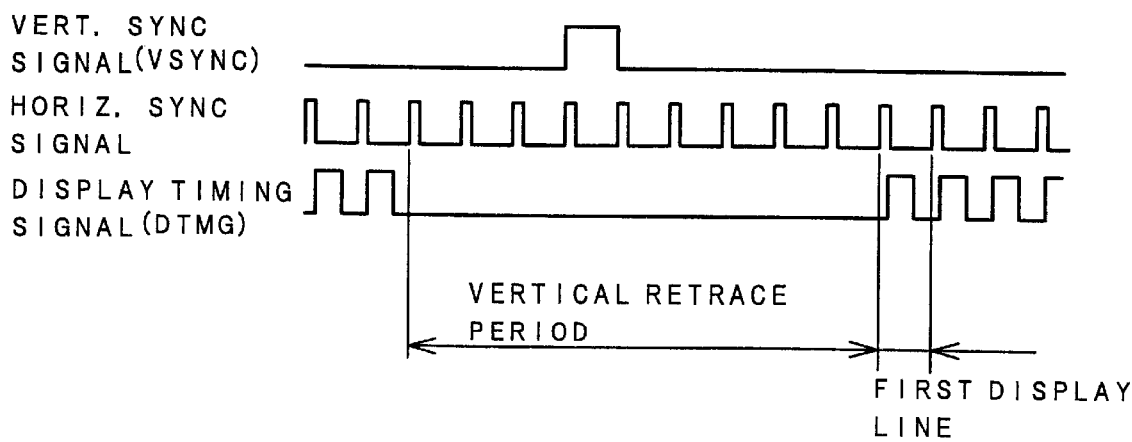
Figure 10:
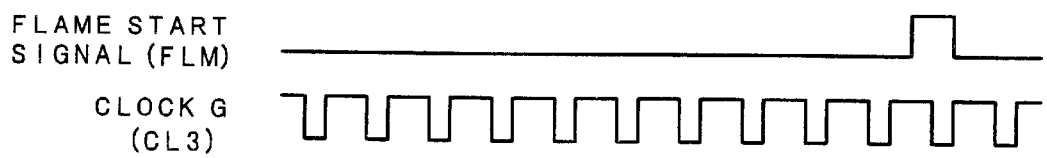

FIG. 10 is a timing chart showing display data to be inputted to the display control device CRL from the signal source (main frame) and signals to be outputted to the drain driver DDR and the gate driver GDR from the display control device CRL. The display control device CRL receives control signals (a clock signal, a display timing signal and a synchronizing signal) from the signal source, and generates a clock D1 (CL1), a shift clock D2 (CL2) and display data as control signals for the drain drivers DDR and, at the same time, generates a frame starting direction signal FLM, a clock G (CL3) and display data as control signals for the gate driver GDR.

Incidentally, in a scheme which uses a low-voltage differential signal (an LVDS signal) for the transmission of display data from the signal source, the LVDS signal from the signal source is converted into an original signal by an LVDS reception circuit mounted on a circuit board (an interface board) on which the display control device is mounted, and the original signal is supplied to both the gate driver GDR and the drain driver DDR.

As is apparent from FIG. 10, the frequency of the shift clock signal D2 (CL2) for the drain driver DDR is the same as the frequency of each of a clock signal (DCLK) and display data inputted from a main-frame computer or the like, and reaches a high frequency of about 40 MHz (megahertz) in the case of an XGA display device.

Figure 11:
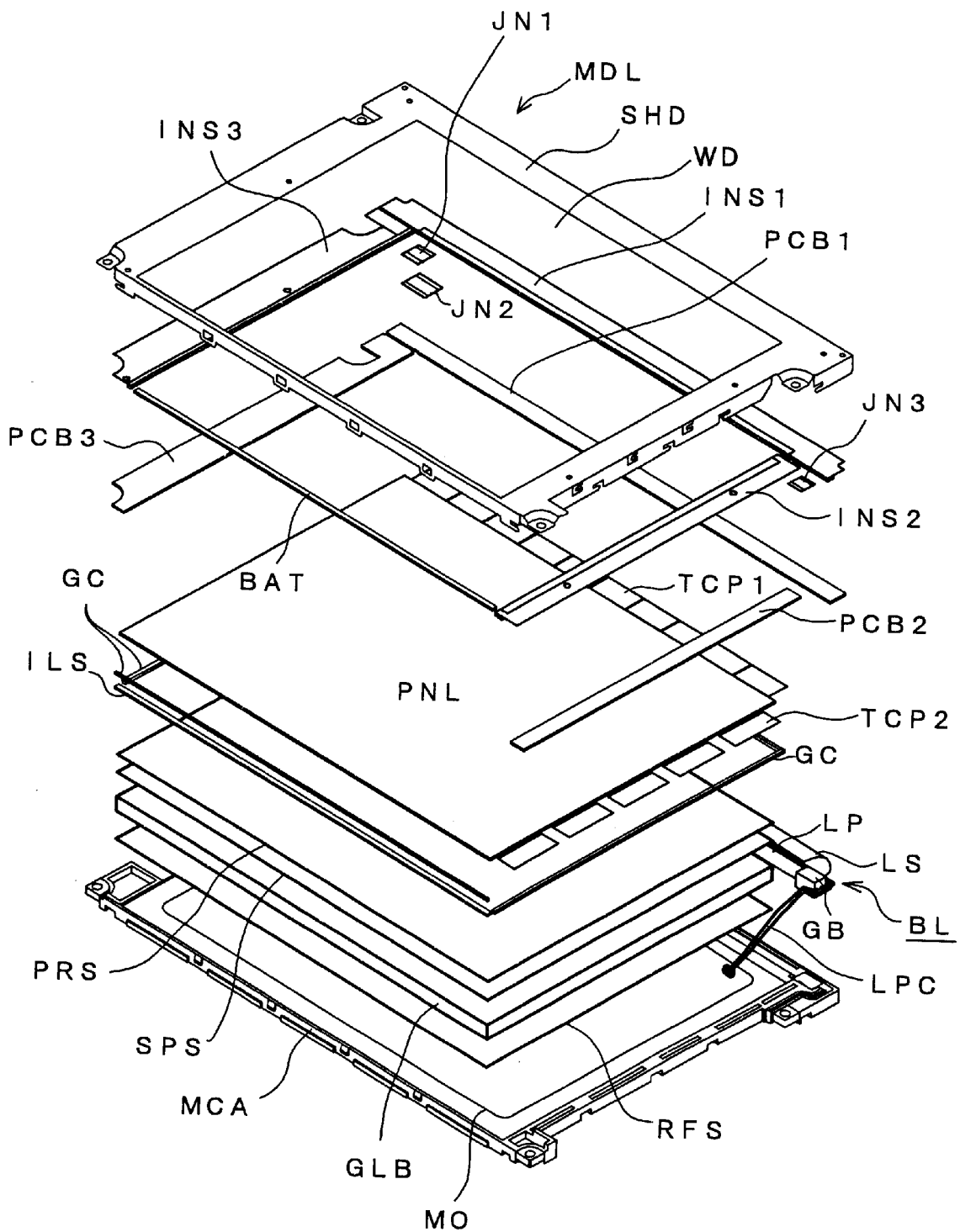
FIG. 11 is a developed perspective view illustrating the entire construction of the liquid crystal display device according to the present invention.

FIG. 11 is a developed perspective view illustrating the entire construction of the liquid crystal display device according to the present invention, and illustrates a specific structure of the liquid crystal display device (hereinafter referred to as a liquid crystal module (MDL) which integrally includes a liquid crystal panel with two substrates SUB1 and SUB2 adhered to one another, a driving part, a backlight and other constituent members).

Symbol SHD denotes a shield case made of a metal sheet (also called a metal frame), symbol WD a display window, symbols INS1 to INS3 insulating sheets, symbols PCB1 to PCB3 circuit boards which constitute the driving part (PCB1 is a drain-side circuit board: a video signal line driving circuit board, PCB2 is a gate-side circuit board, and PCB3 is an interface circuit board), symbols JN1 to JN3 joiners which electrically connect the circuit boards PCB1 to PCB3 to one another, symbols TCP1 and TCP2 tape carrier packages, symbol PNL a liquid crystal panel, symbol GC a rubber cushion, symbol ILS a light shield spacer, symbol PRS a prism sheet, symbol SPS a diffusing sheet, symbol GLB a light guide plate, symbol RFS a reflection sheet, symbol MCA a lower case (mold frame) which is formed by integral molding, symbol MO an aperture of the lower case MCA, symbol LP a fluorescent tube, symbol LPC a lamp cable, symbol GB a rubber bush which supports the fluorescent tube LP, symbol BAT a double-sided adhesive tape, and symbol BL a backlight made of a fluorescent tube, a light guide plate or the like. The liquid crystal module MDL is assembled by stacking diffusing plate members in the shown layered arrangement.

The liquid crystal module MDL has two kinds of housing/holding members, the lower case MCA and the shield case SHD, and the metal-made shield case SHD in which the insulating sheets INS1 to INS3, the circuit boards PCB1 to PCB3 and the liquid crystal panel PNL are fixedly housed is combined with the lower case MCA in which the backlight BL made of the fluorescent tube LP, the light guide plate GLB, the prism sheet PRS and the like are housed.

An integrated circuit chip for driving each pixel of the liquid crystal panel PNL is mounted on the video signal line driving circuit board PCB1, and an integrated circuit chip for receiving a video signal and a control signal such as a timing signal from an external host, a timing converter TCON which processes timing and generates a clock signal and the like are mounted on the interface circuit board PCB3.

As described previously, the clock signal generated by the timing converter TCON is supplied to the integrated circuit chip mounted on the video signal line driving circuit board PCB1 via a clock signal line CLL which is formed in the interface circuit board PCB3 and the video signal line driving circuit board PCB1.

Each of the interface circuit board PCB3 and the video signal line driving circuit board PCB1 is a multilayer printed circuit board, and the clock signal line CLL is formed as an internal layer line of the interface circuit board PCB3 and the video signal line driving circuit board PCB1.

The video signal line driving circuit board PCB1, the gate-side circuit board PCB2 and the interface circuit board PCB3 for driving TFTs are connected to the liquid crystal panel PNL by the tape carrier packages TCP1 and TCP2, and these circuit boards are connected to one another by the joiners JN1, JN2 and JN3. The liquid crystal panel PNL is an active matrix electric field type liquid crystal display device according to the above-described present invention, and is provided with grain-containing spacers and polymer beads such as those described previously in connection with the embodiments, for the purpose of maintaining the gap between the two substrates at a predetermined value.

Incidentally, the present invention can similarly be applied to a construction which adopts a Glass-On-Chip scheme (also called an FCA scheme) according to which individual drive circuits (drain drivers and gate drivers) are directly mounted on one of the substrates of a liquid crystal panel, generally, at the periphery of the substrate SUB1.

The liquid crystal panel PNL is an active matrix electric field type liquid crystal display device according to the above-described present invention, and is provided with grain-containing spacers and polymer beads such as those described previously in connection with the embodiments, for the purpose of maintaining the gap between the two substrates at a predetermined value.

Figure 12:
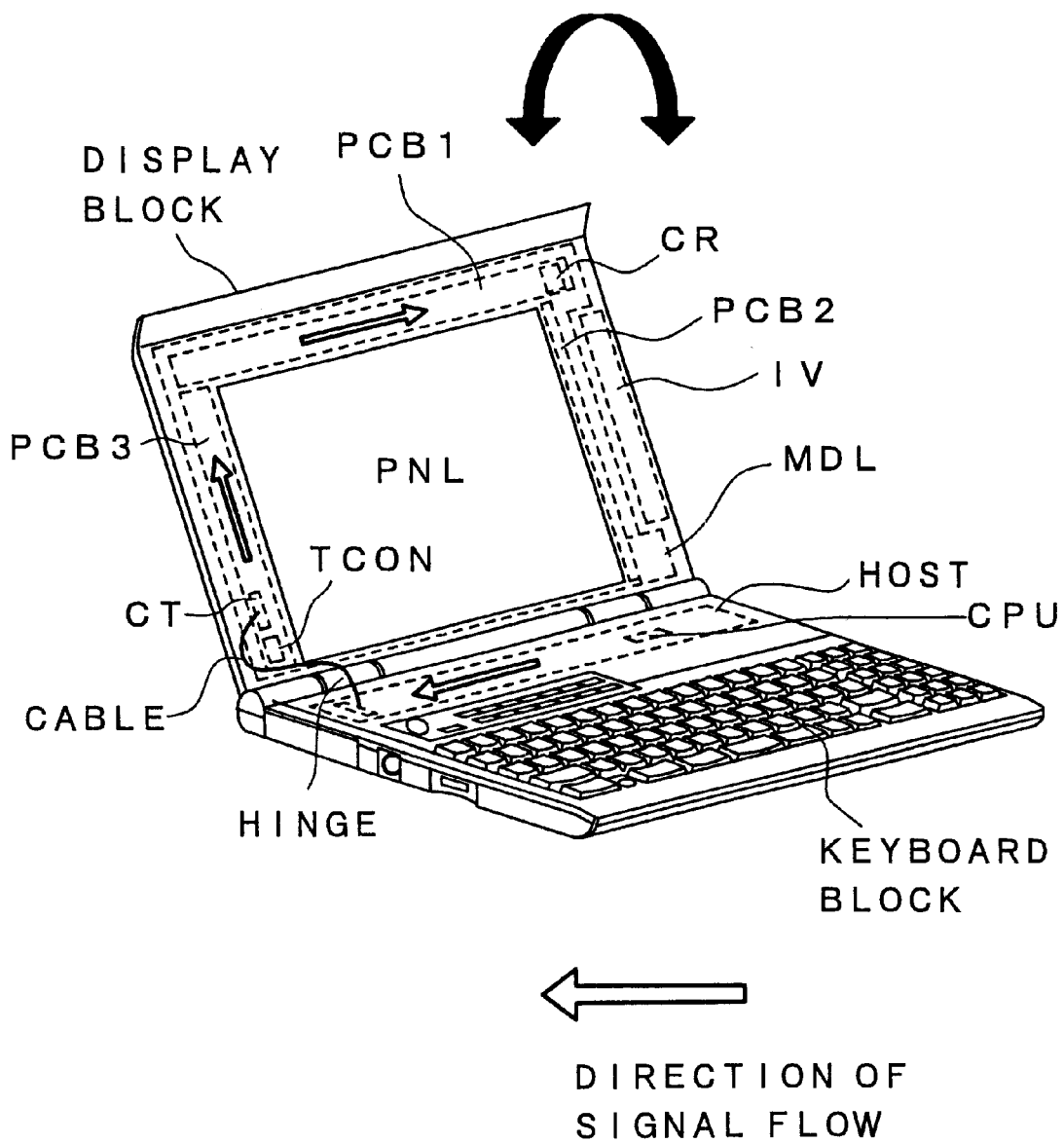
FIG. 12 is a perspective view of a notebook type computer which is one example of electronic equipment in which a liquid crystal display device according to the present invention is mounted.

FIG. 12 is a perspective view of a notebook type computer which is one example of electronic equipment in which a liquid crystal display device according to the present invention is mounted.

This notebook type computer (portable personal computer) is made of a keyboard block (main-frame block) and a display block which is joined to the keyboard block by a hinge. The keyboard block houses a keyboard and a signal generating function such as a host (host computer) or a CPU. The display block has the liquid crystal panel PNL, and the driving circuit boards PCB1 and PCB2, the driving circuit board PCB3 provided with the control chip TCON, and an inverter power source board which is a black light power source are mounted at the periphery of the liquid crystal panel PNL.

In addition, the liquid crystal module described above with reference to FIG. 12, which is integrally provided with the liquid crystal panel PNL, the various circuit boards PCB1, PCB2 and PCB3, the inverter power source board and the backlight, is mounted in the notebook type computer.

Figure 13:
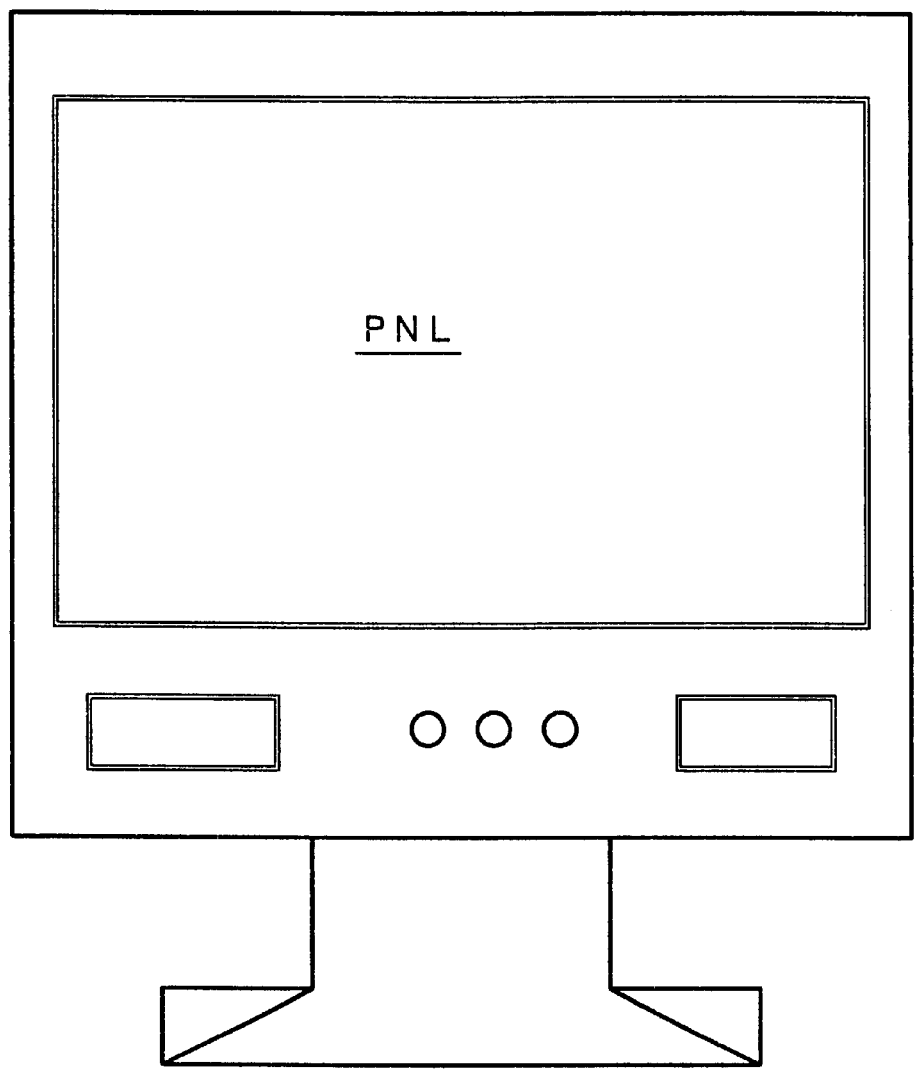
FIG. 13 is a front view showing a display monitor as another example of electronic equipment in which a liquid crystal display device according to the present invention is mounted.

FIG. 13 is a front view showing a display monitor as another example of electronic equipment in which a liquid crystal display device according to the present invention is mounted. This display monitor is made of a display part and a stand part, and a liquid crystal display device which has a liquid crystal panel PNL according to the above-described present invention is mounted in the display part. A host computer or a television receiver circuit may be built in the stand part of such a display monitor.

As described previously, the present invention is not limited to any of the embodiment, and various modifications can be made without departing from the technical ideas of the present invention.

As is apparent from the foregoing description, according to the present invention, spacers fixedly formed on one of the substrates of a liquid crystal panel are used together with polymer beads as members which restrict the gap between the substrates, whereby the restriction of the gap which cannot be followed by the spacers can be compensated for by the polymer beads and the occurrence of gap irregularity in a display area can be restrained. In addition, since the number of polymer beads to be scattered can be reduced to the required minimum, it is possible to obtain a liquid crystal display device which is reduced in the amount of light leak from the display area and can display a high-quality picture.

What is claimed is:

1. A liquid crystal display device comprising: a liquid crystal panel having a pair of substrates;

at least two or more kinds of color filters formed over one of said pair of substrates;

a black matrix interposed between each of said color filters in matrix shape;

a liquid crystal layer interposed between said pair of substrates, a spacer formed on at least one of said pair of substrates; and a bead interposed between said pair of substrates, wherein said spacer is disposed above said black matrix, and the height of said bead is greater than the height of said spacer.

2. The liquid crystal display device according to claim 1 further including a plurality of pixels being constructed with a plurality of gate lines and a plurality of drain lines arranged in a matrix shape on another of said substrates, a switching element being provided in each of said plurality of pixels, said bead disposed on one of said plurality of pixels, said spacer disposed on one of said plurality of gate lines or said drain lines.

3. The liquid crystal display device according to claim 1 wherein said spacer is made of a resin material.

4. The liquid crystal display device according to claim 1 further including an orientation layer formed over said pair of substrates, and an overcoating film formed over said orientation layer, said spacer being disposed between said orientation layer and said overcoating film.

5. The liquid crystal display device according to claim 4 further including an electrode formed between said orientation layer and said overcoating film on one of said pair of substrates, said spacer being disposed on said overcoating film through an opening formed in said electrode.

6. The liquid crystal display device according to claim 4 further including an electrode formed between said orientation layer and said overcoating film on one of said pair of substrates, said spacer being formed on said electrode.

7. The liquid crystal display device according to any of claim 5 or claim 6 wherein said overcoating film is formed over said color filters, said electrode is formed on said overcoating film, and said orientation layer is formed over said electrode.

8. The liquid crystal display device according to claim 4 further including an electrode structure which generates an electric field therebetween, at least one counter electrode formed on one of said pair of substrates, and at least one pixel electrode formed on another of said pair of substrates.

9. The liquid crystal display device according to claim 8 wherein said bead disposed on one of said at least one pixel electrode.

10. The liquid crystal display device according to claim 2 further including at least one pair of pixel electrodes and common electrodes provided in a comb shape for each pixel between a face of another of said pair of substrates and a face of said liquid crystal layer.

11. The liquid crystal display device according to claim 10 wherein said bead is disposed on any of said comb shaped electrodes.

12. A liquid crystal display device comprising:

liquid crystal panel having a pair of substrates;

at least two or more kinds of color filters formed over one of said pair of substrates;

a black matrix interposed between each of said color filters in matrix shape;

a liquid crystal layer interposed between said pair of substrates, drain lines and gate lines formed on another of said pair of substrates and crossing each other in a matrix form, a plurality of pixels, each having a drain electrode couple to one of said drain lines and a gate electrode couple to one of said gate lines;

a spacer formed above said black matrix, and a bead formed under said color filter and having a height greater than a height of said spacer and less than or equal to 1.095 times said height of said spacer.

13. A liquid crystal display device comprising:

a liquid crystal panel having a pair of substrates;

at least two or more kinds of color filters formed over one of said pair of substrates;

a black matrix interposed between each of said color filters in matrix shape;

a liquid crystal layer interposed between said pair of substrates, drain lines and gate lines formed on another of said pair of substrates and crossing each other in a matrix form, a plurality of pixels are formed by adjoining said drain lines and said gate lines;

a spacer formed above said black matrix, and a bead formed under said color filter and having a height greater than a height of said spacer and less than or equal to 1.2 times said height of said spacer.

14. The liquid crystal display device according to claims 12 or 13 wherein at least one pair of pixel electrodes and common electrodes provided in a comb shape for each pixel between a face of another of said pair of substrates and a face of said liquid crystal layer.

15. The liquid crystal display device according to claims 12 or 13 wherein said spacer and said overcoating film are the same material.

16. The liquid crystal display device according to claims 12 or 13 wherein said spacer and said black matrix are the same material.

* * * * *